(12) United States Patent
Waters (10) Patent No.: US 12,449,445 B2
(45) Date of Patent: Oct. 21, 2025

(54) REMOTE CONTROL DEVICES FOR PROBE SYSTEMS, PROBE SYSTEMS THAT INCLUDE THE REMOTE CONTROL DEVICES, AND METHODS OF REMOTELY OPERATING A MOTORIZED POSITIONER OF A PROBE SYSTEM

(71) Applicant: FormFactor, Inc., Livermore, CA (US)

(72) Inventor: Benjamin E. Waters, Portland, OR (US)

(73) Assignee: FormFactor, Inc., Livermore, CA (US)

( * ) Notice: Subject to any disclaimer, the term of this patent is extended or adjusted under 35 U.S.C. 154(b) by 182 days.

(21) Appl. No.: 18/468,568

(22) Filed: Sep. 15, 2023

(65) Prior Publication Data

US 2024/0110942 A1    Apr. 4, 2024

Related U.S. Application Data

(60) Provisional application No. 63/411,305, filed on Sep. 29, 2022.

(51) Int. Cl.
*G01R 1/067* (2006.01)
*G01R 31/28* (2006.01)

(52) U.S. Cl.
CPC ..... *G01R 1/06705* (2013.01); *G01R 31/2887* (2013.01)

(58) Field of Classification Search
CPC ............ G01R 1/06705; G01R 31/2887; G01R 31/287
See application file for complete search history.

(56) References Cited

U.S. PATENT DOCUMENTS

| | | | |
|---|---|---|---|
| 2001/0024119 A1* | 9/2001 | Stockford | G01R 31/2808 324/763.01 |
| 2017/0043477 A1* | 2/2017 | Kitayama | B25J 11/0075 |
| 2023/0120201 A1* | 4/2023 | Howard | G01R 31/2868 324/754.03 |

\* cited by examiner

*Primary Examiner* — G.M. A Hyder
(74) *Attorney, Agent, or Firm* — KOLITCH ROMANO DASCEZO GATES LLC (57) ABSTRACT

Remote control devices for motorized positioners of probe systems, probe systems that include the remote control devices, and methods of remotely operating a motorized positioner of a probe system are disclosed herein. The remote control devices include a first rotary encoder, a second rotary encoder, a third rotary encoder, and a remote processing device. The probe systems include a chuck, a signal generation and analysis assembly, a probe, a motorized positioner, a local processing device, and the remote control device. The methods include generating a control signal utilizing the remote control device and transmitting the control signal to the probe system. The methods also include translating a probe of the probe system relative to a support surface of the probe system. The translating is based, at least in part, on the control signal.

25 Claims, 5 Drawing Sheets

REMOTE CONTROL DEVICES FOR PROBE SYSTEMS, PROBE SYSTEMS THAT INCLUDE THE REMOTE CONTROL DEVICES, AND METHODS OF REMOTELY OPERATING A MOTORIZED POSITIONER OF A PROBE SYSTEM

RELATED APPLICATION

This application claims priority to U.S. Provisional Patent Application No. 63/411,305, which was filed on Sep. 29, 2022, and the complete disclosure of which is hereby incorporated by reference.

FIELD OF THE DISCLOSURE

The present disclosure relates generally to remote control devices for probe systems, to probe systems that include the remote control devices, and to methods of remotely operating a motorized positioner of a probe system.

BACKGROUND OF THE DISCLOSURE

Probe systems may be utilized to test a device under test, such as a semiconductor device, an optical device, and/or an optoelectronic device. It may be desirable to operate probe systems from a remote location, such as to permit and/or to facilitate adjustment of the probe systems without the need to physically interact with, or touch, the probe systems. In a specific example, it may be desirable to remotely adjust a motorized manipulator of the probe system in order to remotely adjust a location of a probe of the probe system relative to a device under test (DUT). Conventional approaches to remote probe adjustment have relied upon remote software solutions. These remote software solutions are cumbersome, requiring a large number of mouse clicks, parameter selections, and the like in order to accomplish simple motions of the probe. Thus, there exists a need for improved remote control devices for probe systems, for improved probe systems that include the remote control devices, and/or for improved methods of remotely operating a motorized positioner of a probe system.

SUMMARY OF THE DISCLOSURE

Remote control devices for motorized positioners of probe systems, probe systems that include the remote control devices, and methods of remotely operating a motorized positioner of a probe system are disclosed herein. The remote control devices include a first rotary encoder, a second rotary encoder, a third rotary encoder, and a remote processing device. The first rotary encoder includes a first encoder shaft and is configured to generate a first encoder signal indicative of rotation of the first encoder shaft. The second rotary encoder includes a second encoder shaft and is configured to generate a second encoder signal indicative of rotation of the second encoder shaft. The third rotary encoder includes a third encoder shaft and is configured to generate a third encoder signal indicative of rotation of the third encoder shaft. The remote processing device is configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system.

The probe systems include a chuck, a signal generation and analysis assembly, a probe, a motorized positioner, a local processing device, and the remote control device. The chuck defines a support surface configured to support a substrate that includes a device under test (DUT). The signal generation and analysis assembly is configured to at least one of generate a test signal and analyze a resultant signal. The probe is configured to at least one of provide the test signal to the DUT and receive the resultant signal from the DUT. The motorized positioner is configured to selectively translate the probe, relative to the support surface, in three dimensions and along three axes. The local processing device is configured to receive the control signal from the remote processing device and to control the operation of the motorized positioner based, at least in part, on the control signal.

The methods include generating a control signal utilizing the remote control device and transmitting the control signal to the probe system. The methods also include translating a probe of the probe system relative to a support surface of the probe system. The translating is based, at least in part, on the control signal.

DETAILED DESCRIPTION AND BEST MODE OF THE DISCLOSURE

FIGS. 1-5 provide examples of remote control devices 100, of probe systems 10, and/or of methods 300, according to the present disclosure. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure. In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 1:
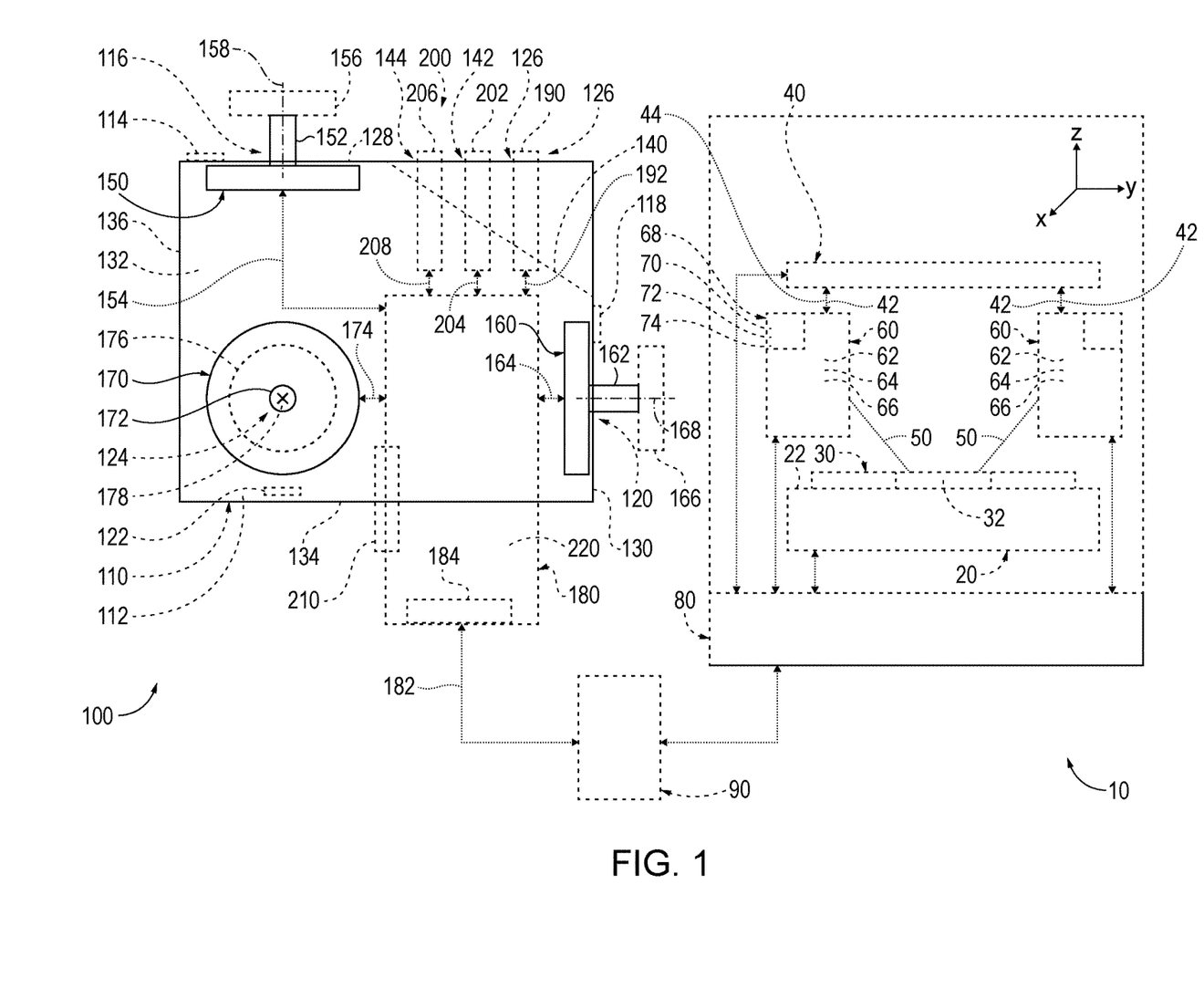
FIG. 1 is a schematic illustration of examples of a remote control device that may be utilized with a probe system and/or that may be utilized to perform methods, according to the present disclosure.
Figure 2:
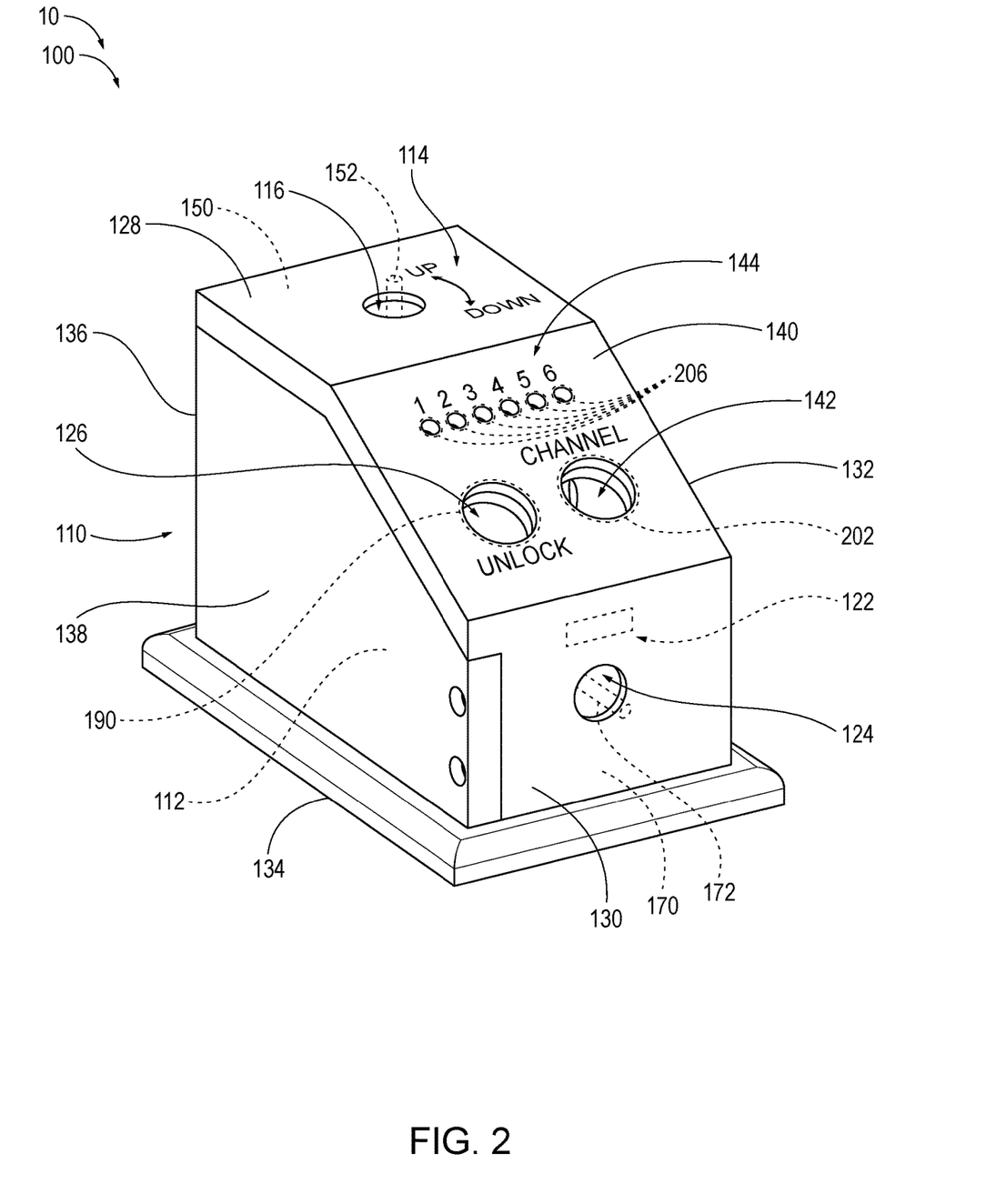
FIG. 2 is a less schematic illustration of an example of a housing that may be utilized with the remote control devices of FIG. 1.
Figure 3:
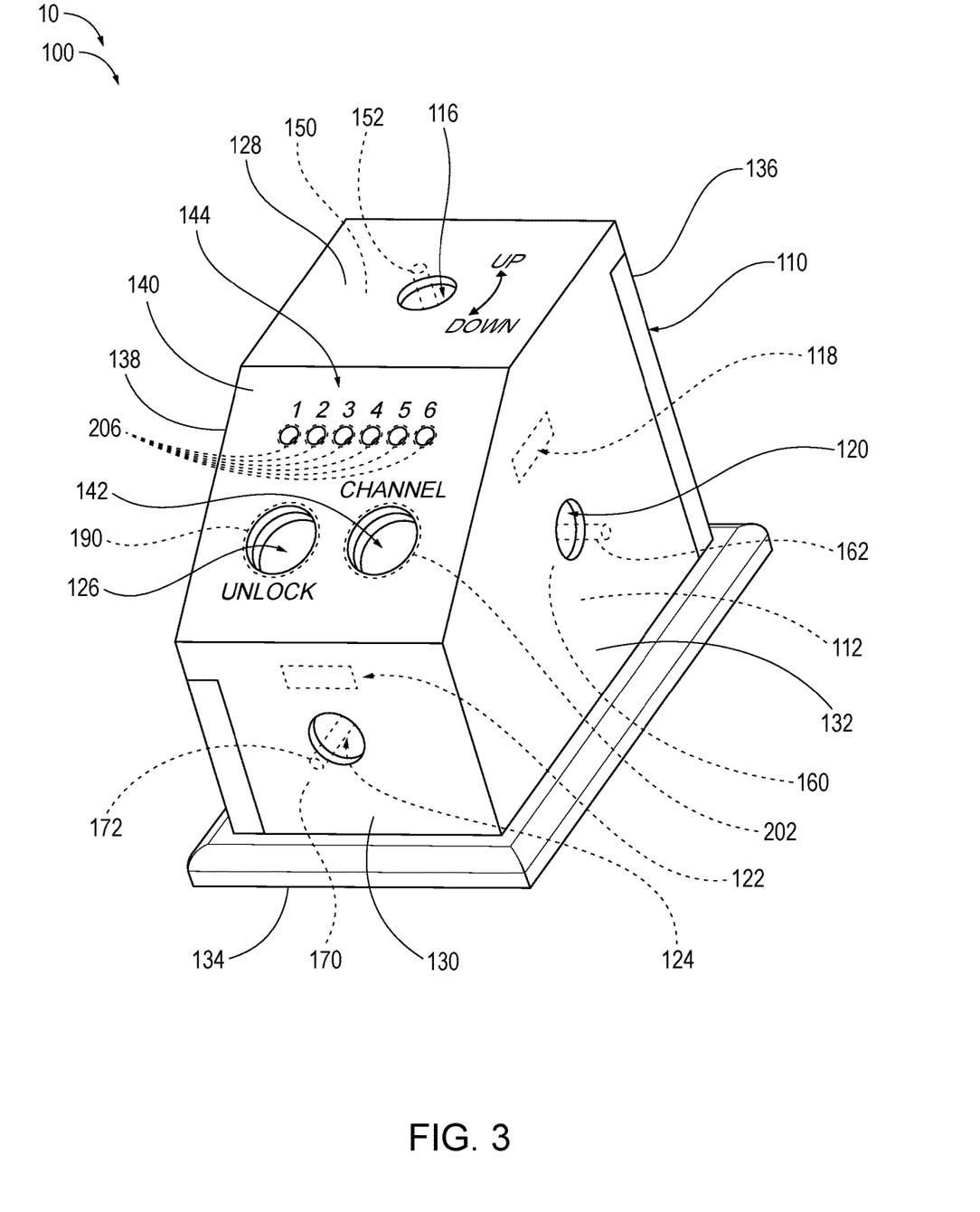
FIG. 3 is another less schematic illustration of the example of the housing of FIG. 2.
Figure 4:
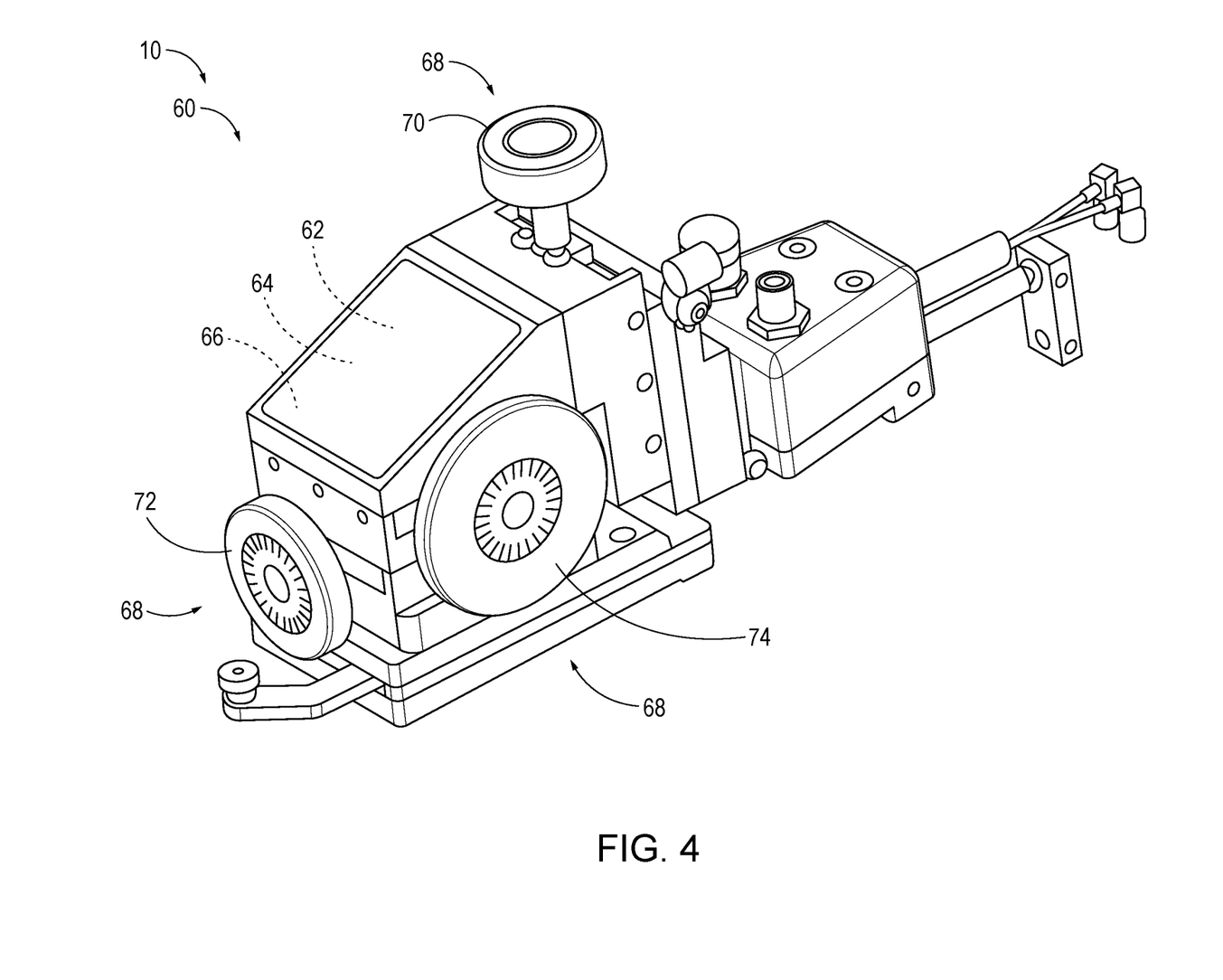
FIG. 4 is an example of a motorized positioner that may be included in and/or utilized with probe systems, remote control devices, and/or methods, according to the present disclosure.

FIG. 1 is a schematic illustration of examples of a remote control device 100 that may be utilized with a probe system 10 and/or that may be utilized to perform methods 300, according to the present disclosure. FIGS. 2-3 are less schematic illustrations of examples of a housing 110 that may be utilized with the remote control devices of FIG. 1. FIG. 4 is an example of a motorized positioner 60 that may be included in and/or utilized with probe systems 10, remote control devices 100, and/or methods 300, according to the present disclosure.

As collectively illustrated by FIGS. 1-4, and with specific reference to FIG. 1, probe systems 10 may include a chuck 20 that defines a support surface 22. Support surface 22 may be configured to support a substrate 30 that includes a device under test (DUT) 32. Examples of substrate 30 include a wafer, a semiconductor wafer, a silicon wafer, and/or a type III-V semiconductor wafer. Examples of DUT 32 include an electronic device, an optical device, and/or an optoelectronic device.

Probe systems 10 also may include a signal generation and analysis assembly 40 and at least one probe 50. Signal generation and analysis assembly 40 may be configured to generate a test signal 42, which may be provided to DUT 32 via probe 50, and/or to receive a resultant signal 44, which may be received from DUT 32 via probe 50. Examples of signal generation and analysis assembly 40 include a signal generator, a function generator, a direct current source, an alternating current source, an electromagnetic radiation source, a signal analyzer, a current detector, a voltage detector, and/or an electromagnetic radiation detector.

Probe 50 may include and/or be an electrical probe. In such examples, probe 50 may be configured to provide test signal 42 to DUT 32 in the form of an electrical test signal and/or to receive resultant signal 44 from DUT 32 in the form of an electrical resultant signal. Additionally or alternatively, probe 50 may include and/or be an electromagnetic probe. In such examples, probe 50 may be configured to provide test signal 42 to DUT 32 in the form of an electromagnetic test signal and/or to receive resultant signal 44 from DUT 32 in the form of an electromagnetic resultant signal.

Probe systems 10 also may include at least one motorized positioner 60. Motorized positioner 60 may be configured to selectively translate probe 50 relative to support surface 22 in three dimensions and/or along 3 axes, such as the x-, y-, and z-axes that are illustrated in FIG. 1. During operation of probe systems 10 and/or utilization of methods 300, and as discussed in more detail herein, it may be desirable to remotely control, direct, and/or regulate the operation of motorized positioner 60, such as from a location that is distinct from, spaced-apart from, and/or remote from a remainder of probe system 10. As an example, a majority of probe system 10, such as chuck 20, signal generation and analysis assembly 40, probe 50, and/or motorized positioner 60 may be positioned and/or physically located within a factory, within a research facility, and/or within a clean room, and a user, who may wish to control the operation of motorized positioner 60, may be in a different room of the factory, research facility, and/or clean room, may be in a different building of the factory, research facility, and/or clean room, may be at home, or even may be in a different city, state, or country from the factory, research facility, and/or clean room.

With this in mind, probe systems 10 further may include a remote control device 100, which may be proximate and/or manipulated by the user, and a local processing device 80, which may be proximate and/or in direct communication with the remainder of the probe system. In such a configuration, the user may manipulate remote control device 100. Responsive to this manipulation, the remote control device may generate a control signal. The control signal may be conveyed to local processing device 80, and the local processing device may control the operation of motorized positioner 60 based, at least in part, on the control signal. As discussed in more detail herein, remote control device 100 may include and/or be a hardware remote control device that includes a plurality of rotary encoders. The rotary encoders may be physically, visibly, spatially, and/or tactilely similar to a manual override device 68 of motorized positioner 60. As such, remote control device 100 may provide an improved user experience and/or may permit and/or facilitate improved, more convenient, and/or more efficient remote operation of motorized positioner 60 when compared to conventional remote software solutions that do not include and/or utilize remote control device 100 according to the present disclosure.

As collectively illustrated by FIGS. 1-3, and with specific reference to FIG. 1, remote control device 100 includes a first rotary encoder 150, a second rotary encoder 160, and a third rotary encoder 170. First rotary encoder 150 may include a first encoder shaft 152 and may be configured to generate a first encoder signal 154 that is indicative of rotation of the first encoder shaft. Similarly, second rotary encoder 160 may include a second encoder shaft 162 and may be configured to generate a second encoder signal 164 that is indicative of rotation of the second encoder shaft. In addition, third rotary encoder 170 may include a third encoder shaft 172 and may be configured to generate a third encoder signal 174 that is indicative of rotation of the third encoder shaft.

As used herein, the phrase, "indicative of rotation" may refer to any suitable signal that provides any suitable information regarding rotation of the corresponding encoder shaft. As an example, an encoder signal may be indicative of an angular location, or an absolute angular location, of the corresponding encoder shaft. As another example, the encoder signal may be indicative of an angular displacement, or motion, of the corresponding encoder shaft. Stated differently, first rotary encoder 150, second rotary encoder 160, and/or third rotary encoder 170 may generate corresponding encoder signals, or changes in corresponding encoder signals, based upon and/or responsive to rotation of the corresponding encoder shaft.

Remote control device 100 also includes and/or is associated with a remote processing device 180. Remote processing device 180 may be configured to receive first encoder signal 154, second encoder signal 164, and/or third encoder signal 174. Remote processing device 180 also may be configured to generate a control signal 182, which may be based upon and/or indicative of the first encoder signal, the second encoder signal, and/or the third encoder signal. Remote control device 100 and/or remote processing device 180 thereof then may transmit control signal 182 to probe system 10 and/or to motorized positioner 60 thereof. Stated differently, remote control device 100 may be configured to remotely control the operation of the motorized positioner 60 via rotation of first encoder shaft 152, via rotation of second encoder shaft 162, and/or via rotation of third encoder shaft 172.

First rotary encoder 150, second rotary encoder 160, and/or third rotary encoder 170 generally may be referred to herein as rotary encoders. Rotary encoders may include any suitable structure that may be adapted, configured, designed, and/or constructed to permit and/or facilitate respective rotation of first encoder shaft 152, second encoder shaft 162, and/or third encoder shaft 172, which generally may be referred to herein as encoder shafts. Additionally or alternatively, rotary encoders may include any suitable structure that may be adapted, configured, designed, and/or constructed to permit and/or facilitate respective generation of first encoder signal 154, second encoder signal 164, and/or third encoder signal 174, which generally may be referred to herein as encoder signals. Examples of rotary encoders that may be included in and/or utilized with remote control devices 100, according to the present disclosure, include a shaft encoder, a mechanical rotary encoder, a conductive rotary encoder, an optical rotary encoder, an on-axis magnetic rotary encoder, an off-axis magnetic rotary encoder, an absolute rotary encoder, and/or an incremental rotary encoder.

As illustrated in FIG. 1, remote control devices 100 and/or rotary encoders thereof may include corresponding rotary knobs, which may be configured to be gripped by the user of the remote control device during, and/or to facilitate, rotation of a corresponding rotary shaft. As specific examples, first rotary encoder 150 may include a first rotary knob 156 that is operatively attached to first encoder shaft 152, second rotary encoder 160 may include a second rotary knob 166 that is operatively attached to second encoder shaft 162, and/or third rotary encoder 170 may include a third rotary knob 176 that is operatively attached to third encoder shaft 172. Rotary knobs additionally and/or alternatively may be referred to herein as knobs, dials, and/or handles.

As also illustrated in FIG. 1, the encoder shafts of the rotary encoders may be configured to rotate about a corresponding rotary axis. As specific examples, first encoder shaft 152 may be configured to rotate about a first rotary axis 158, second encoder shaft 162 may be configured to rotate about a second rotary axis 168, and/or third encoder shaft 172 may be configured to rotate about a third rotary axis 178. First rotary axis 158, second rotary axis 168, and third rotary axis 178 may be orthogonal, or at least substantially orthogonal, to one another.

As discussed, motorized positioner 60 may support probe 50 and may be configured to operatively translate probe 50 relative to support surface 22 of chuck 20. This may include operative translation along the three axes. As illustrated in FIG. 1 with reference to the x-, y-, and z-axes, the three axes may include and/or be three orthogonal, or at least substantially orthogonal, axes.

The three axes may include a first axis, such as the z-axis of FIG. 1, which may extend normal, or at least substantially normal, to support surface 22. First encoder signal 154 may be configured to direct motorized positioner 60 to operatively translate probe 50 along the first axis and/or in a direction that is parallel to the first axis. Stated differently, motorized positioner 60 may be configured to move probe 50 in a first motion direction, which extends parallel to the first axis, responsive to control signal 182 being indicative of rotation of first encoder shaft 152. A magnitude of motion along the first axis may be proportional to a rotational displacement, or a number of degrees of rotation, of first encoder shaft 152; and a direction of motion may be based upon a direction of rotation of the first encoder shaft.

The three axes also include a second axis, such as the x-axis of FIG. 1, which may extend perpendicular, or at least substantially perpendicular, to the first axis and/or parallel, or at least substantially parallel, to support surface 22. Second encoder signal 164 may be configured to direct motorized positioner 60 to operatively translate probe 50 along the second axis and/or in a direction that is parallel to the second axis. Stated differently, motorized positioner 60 may be configured to move probe 50 in a second motion direction, which extends parallel to the second axis, responsive to control signal 182 being indicative of rotation of second encoder shaft 162. A magnitude of motion along the second axis may be proportional to a rotational displacement, or a number of degrees of rotation, of second encoder shaft 162; and a direction of motion may be based upon a direction of rotation of the second encoder shaft.

The three axes also include a third axis, such as the y-axis of FIG. 1, which may extend perpendicular, or at least substantially perpendicular, to the first axis, perpendicular, or at least substantially perpendicular, to the second axis, and/or parallel, or at least substantially parallel, to support surface 22. Third encoder signal 174 may be configured to direct motorized positioner 60 to operatively translate probe 50 along the third axis and/or in a direction that is parallel to the third axis. Stated differently, motorized positioner 60 may be configured to move probe 50 in a third motion direction, which extends parallel to the third axis, responsive to control signal 182 being indicative of rotation of third encoder shaft 172. A magnitude of motion along the third axis may be proportional to a rotational displacement, or a number of degrees of rotation, of third encoder shaft 172; and a direction of motion may be based upon a direction of rotation of the third encoder shaft.

First encoder shaft 152, second encoder shaft 162, and third encoder shaft 172 may have and/or define any suitable orientation, or relative orientation. As an example, the first encoder shaft, the second encoder shaft, and the third encoder shaft may extend orthogonal, or at least substantially orthogonal, to one another. As another example, the first encoder shaft may extend vertically, or at least substantially vertically. As another example, the second encoder shaft may extend horizontally, or at least substantially horizontally. As another example, the third encoder shaft may extend horizontally, or at least substantially horizontally. As yet another example, the relative orientation among the first encoder shaft, the second encoder shaft, and the third encoder shaft may correspond to the relative orientation among the first motion direction, the second motion direction, and the third motion direction, respectively. The first motion direction, the second motion direction, and the third motion direction may be orthogonal, or at least substantially orthogonal, to one another.

Remote processing device 180 may include any suitable structure that may be adapted, configured, and/or designed to receive first encoder signal 154, to receive second encoder signal 164, to receive third encoder signal 174, to generate control signal 182, and/or to transmit the control signal to motorized positioner 60. Examples of remote processing device 180 include a microprocessor and/or a microcontroller. Another example of remote processing device 180 includes an interface device 184, which may be configured to transmit control signal 182. Examples of interface device 184 include a wired interface device, a wired Ethernet device, a universal serial bus (USB) device, a wireless interface device, a wireless Ethernet device, and/or a Bluetooth® device.

With continued reference to FIG. 1, probe system 10 and/or remote control device 100 may include a remote computer 220. In such examples, remote control device 100 may be configured to transmit control signal 182 to motorized positioner 60 with, via, and/or utilizing the remote computer, such as via inclusion of interface device 184, or a separate interface device 184, within the remote computer. When probe system 10 and/or remote control device 100 includes remote computer 220, remote processing device 180 may be distinct from and/or may be defined by the remote computer.

As illustrated in dashed lines in FIG. 1, remote control device 100 may include an interlock actuator 190. Interlock actuator 190, when present, may be adapted, configured, designed, and/or constructed to generate, or to selectively generate, an interlock signal 192 responsive to actuation of the interlock actuator by the user of the remote control device. As an example, interlock actuator 190 may include an interlock actuator momentary switch, which may be configured to generate the interlock signal when the interlock actuator momentary switch is pressed by the user.

As also illustrated in FIG. 1, remote processing device 180 may receive, or may be configured to receive, interlock signal 192. In addition, probe system 10 may be configured such that motorized positioner 60 selectively translates probe 50 when, or only when, interlock actuator 190 is being actuated by the user, only when the interlock signal is generated, and/or only when the interlock signal is received by remote processing device 180. As an example, the remote processing device may be configured only to generate the control signal during generation and/or receipt of the interlock signal. As another example, the remote processing device may be configured only to permit transmission of the control signal to the motorized positioner during generation and/or receipt of the interlock signal. As another example, the first rotary encoder may be configured only to generate the first encoder signal during generation and/or receipt of the interlock signal. As another example, the second rotary encoder may be configured only to generate the second encoder signal during generation and/or receipt of the interlock signal. As another example, the third rotary encoder may be configured only to generate the third encoder signal during generation and/or receipt of the interlock signal. As another example, the motorized positioner may be configured only to respond to the control signal during generation and/or receipt of the interlock signal.

As illustrated in FIG. 1, probe system 10 may include a plurality of motorized positioners 60. With this in mind, remote control device 100 may include a positioner selection structure 200, which may be configured to be actuated by the user to select a desired motorized positioner of the plurality of motorized positioners. Stated differently, positioner selection structure 200 may be utilized, by the user, to select which motorized positioner of the plurality of motorized positioners will move a corresponding probe responsive to rotation of one or more rotary encoders of the remote control device.

As illustrated in FIG. 1, positioner selection structure 200 may include a positioner selection actuator 202. The positioner selection actuator may be configured to be actuated, by the user, to generate, or to selectively generate, a positioner selection signal 204. Positioner selection signal 204 may be configured to indicate, to the probe system, the desired positioner. As an example, remote processing device 180 may receive positioner selection signal 204, and control signal 182 may be indicative of the positioner selection signal. As such, the motorized positioner and/or the local processing device may receive the control signal, may select the desired positioner for control based upon the control signal, and/or may control operation of the desired positioner based, at least in part, on the control signal.

Positioner selection actuator 202 may include any suitable structure that may be configured to be actuated by the user and/or to selectively generate the positioner selection signal based upon and/or responsive to actuation by the user. An example of positioner selection actuator 202 includes a positioner selection actuator momentary switch.

As also illustrated in FIG. 1, positioner selection structure 200 additionally or alternatively may include a positioner selection display 206. Positioner selection display 206 may be configured to display, to the user, which motorized positioner of the plurality of motorized positioners is selected as the desired motorized positioner. Stated differently, positioner selection display 206 may be configured to display and/or to indicate the desired motorized positioner to the user. This may be accomplished in any suitable manner. As an example, remote processing device 180 may be configured to provide a display signal 208, which is indicative of the desired motorized positioner, to positioner selection display 206. Examples of positioner selection display 206 include a light emitting diode (LED), a plurality of LEDs, a numeric display, and/or an alphanumeric display.

As illustrated schematically in FIG. 1 and less schematically in FIGS. 2-3, remote control device 100 may include a housing 110. Housing 110 may define an enclosed volume 112 and/or may at least partially contain first rotary encoder 150, second rotary encoder 160, third rotary encoder 170, and/or remote processing device 180. As an example, housing 110 may include a first encoder opening 116, and first rotary encoder 150 may be positioned within enclosed volume 112 such that first encoder shaft 152 is accessible via the first encoder opening. As another example, housing 110 may include a second encoder opening 120, and second rotary encoder 160 may be positioned within enclosed volume 112 such that second encoder shaft 162 is accessible via the second encoder opening. As another example, housing 110 may include a third encoder opening 124, and third rotary encoder 170 may be positioned within enclosed volume 112 such that third encoder shaft 172 is accessible via the third encoder opening.

As also illustrated in FIGS. 1-3, housing 110 may include a first label 114, a second label 118, and/or a third label 122. First label 114 may be associated with first encoder shaft 152 and/or may be indicative of a motion direction of motorized positioner 60 and/or of probe 50 responsive to rotation of the first encoder shaft. Second label 118 may be associated with second encoder shaft 162 and/or may be indicative of a motion direction of motorized positioner 60 and/or of probe 50 responsive to rotation of the second encoder shaft. Third label 122 may be associated with third encoder shaft 172 and/or may be indicative of a motion direction of motorized positioner 60 and/or of probe 50 responsive to rotation of the third encoder shaft.

As also illustrated in FIGS. 1-3, housing 110 may include an interlock actuator opening 126. Interlock actuator 190 may be accessible via interlock actuator opening 126. As also illustrated in FIGS. 1-3, housing 110 may include a positioner selection actuator opening 142. Positioner selection actuator 202 may be accessible via positioner selection actuator opening 142. As also illustrated in FIGS. 1-3, housing 110 may include a positioner display opening 144. Positioner display 206 may be accessible via positioner display opening 144.

Housing 110 may define an upper surface 128, a front surface 130, a side surface 132, a bottom surface 134, a back surface 136, and an opposed side surface 138. First rotary encoder 150 may be accessible via upper surface 128. Front surface 130 may extend perpendicular, or at least substantially perpendicular, to upper surface 128, and second rotary encoder 160 may be accessible via the front surface. Side surface 132 may extend perpendicular, or at least substantially perpendicular, to both upper surface 128 and front surface 130, and third rotary encoder 170 may be accessible via the side surface. Bottom surface 134 may extend parallel, or at least substantially parallel, to upper surface 128 and/or perpendicular, or at least substantially perpendicular, to front surface 130, side surface 132, and/or opposed side surface 138. Back surface 136 may extend parallel, or at least substantially parallel, to front surface 130 and/or perpendicular, or at least substantially perpendicular, to side surface 132, bottom surface 134, and/or opposed side surface 138. Opposed side surface 138 may extend parallel, or at least substantially parallel, to side surface 132 and/or perpendicular, or at least substantially perpendicular, to upper surface 128, front surface 130, bottom surface 134, and/or back surface 136.

As used herein, the phrase "accessible via" means that the corresponding structure extends external enclosed volume 112 via the corresponding opening, that a user may manipulate and/or rotate the corresponding structure from external the enclosed volume via the corresponding opening, and/or that the user may view the corresponding structure from external the enclosed volume via the corresponding opening.

As illustrated in dashed lines in FIG. 1 and in solid lines in FIGS. 2-3, housing 110 also may define a transition surface 140. Transition surface 140 may taper from upper surface 128 to front surface 130 and/or may taper from upper surface 128 and toward bottom surface 134. Interlock actuator 190 and/or positioner selection structure 200, including positioner selection actuator 202 and/or positioner selection display 206, may be positioned on transition surface 140.

Motorized positioner 60 may include any suitable structure that may permit and/or facilitate translation of probe 50 in the three dimensions, to be controlled by local processing device 80, and/or to translate the probe based, at least in part, on control signal 182. As an example, motorized positioner 60 may include a first actuator 62, a second actuator 64, and a third actuator 66. First actuator 62 may be configured to move the probe along the first axis, second actuator 64 may be configured to move the probe along the second axis, and third actuator 66 may be configured to move the probe along the third axis. Examples of first actuator 62, second actuator 64, and/or third actuator 66 include any suitable motor, electric motor, linear actuator, rack and pinion assembly, lead screw and nut assembly, and/or linear motor.

As schematically illustrated in FIG. 1 and less schematically illustrated in FIG. 4, motorized positioner 60 may include a manual override device 68, which may be configured to manually translate probe 50 relative to support surface 22 along the three axes. Manual override device 68 may include any suitable structure. As an example, manual override device 68 may include a first manual override knob 70, which may be configured to manually translate the probe relative to the support surface along the first axis, a second manual override knob 72, which may be configured to manually translate the probe relative to the support surface along the second axis, and a third manual override knob 74, which may be configured to manually translate the probe relative to the support surface along the third axis.

It is within the scope of the present disclosure that an external appearance of the remote control device 100 may correspond to an external appearance of the manual override device 68. Such a configuration may permit and/or facilitate more improved and/or natural adjustment of the position of probe 50 utilizing remote control device 100.

As an example, an orientation and/or appearance of first rotary knob 156 may correspond to an orientation and/or appearance of first manual override knob 70. As another example, an orientation and/or appearance of second rotary knob 166 may correspond to an orientation and/or appearance of second manual override knob 72. As another example, an orientation and/or appearance of third rotary knob 176 may correspond to an orientation and/or appearance of third manual override knob 74. As another example, a relative orientation among first rotary knob 156, second rotary knob 166, and third rotary knob 176 may correspond to a relative orientation among first manual override knob 70, second manual override knob 72, and third manual override knob 74. As another example, labeling on remote control device 100, such as first label 114, second label 118, and/or third label 122, may correspond to labeling on manual override device 68.

As discussed, remote control device 100 may include interlock actuator 190, which may be configured to selectively produce and/or generate interlock signal 192. With this in mind, probe system 10 may include a plurality of electronic interlocks. The electronic interlocks may be configured to restrict operation of at least a portion of probe system 10 and/or to restrict the operation to specified and/or predetermined conditions. However, the probe system may be configured to override at least one electronic interlock of the plurality of electronic interlocks responsive to generation of the interlock signal by the remote control device and/or responsive to receipt of the interlock signal by local processing device 80. As an example, the at least one electronic interlock may include a distance interlock, which may be configured to restrict motion of the probe, in a direction that is parallel to support surface 22, when a distance between the probe and the DUT is less than a threshold distance. Stated differently, the distance interlock generally may not permit motorized positioner 60 to move probe 50 in the direction that is parallel to support surface 22 when the distance between the probe and the DUT is less than the threshold distance. Such a configuration may decrease a potential for inadvertent lateral and/or tangential contact between the probe and the DUT during motion of the probe relative to the DUT.

The threshold distance may include and/or be any suitable distance between the probe and the DUT, such as a distance beyond which the user may be confident that the probe will not contact the DUT during motion of the probe in the direction that is parallel to the support surface. Examples of the threshold distance include distances of at least 0.1 micrometers ($\mu m$), at least 0.25 $\mu m$, at least 0.5 $\mu m$, at least 1 $\mu m$, at least 2 $\mu m$, at least 3 $\mu m$, at least 4 $\mu m$, at least 5 $\mu m$, at least 10 $\mu m$, at most 25 $\mu m$, at most 20 $\mu m$, at most 15 $\mu m$, at most 10 $\mu m$, at most 5 or at most 1 $\mu m$.

However, upon receipt of interlock signal 192, probe system 10 may be configured to permit motorized positioner 60 to move probe 50 in the direction that is parallel to support surface 22, while under control of remote control device 100, even when the distance between the probe and the DUT is less than the threshold distance. Such a configuration may cause operation of remote control device 100 to be more intuitive and/or more similar to operation of motorized positioner 60 via manual override device 68 when compared to conventional approaches to remote probe adjustment.

As illustrated in FIG. 1, remote control device 100 may include a distance notification structure 210. Distance notification structure 210 may be configured to notify the user when the distance between the probe and the DUT is less than the threshold distance and remote control device 100 is generating interlock signal 192. Such a configuration may inform the user to exercise extra caution when making adjustments to the relative orientation between the probe and the DUT when the distance between the probe and the DUT is less than the threshold distance and/or such that contact between the probe and the DUT is likely to, or could, occur. Examples of distance notification structure 210 include a display, a light, and/or an LED light.

As discussed, remote control device 100 may be at a different location from a remainder of probe system 10. As examples, a distance between remote control device 100 and motorized positioner 60 may be at least 100 meters, at least 1 kilometer (km), at least 5 km, at least 10 km, at least 25 km, at least 50 km, or at least 100 km. With this in mind, and as illustrated in FIG. 1, a network connection 90 may be utilized to permit and/or to facilitate communication between remote control device 100 and the remainder of probe system 10. Examples of network connection 90 include a wireless network, a cellular network, an Ethernet network, and/or the internet.

Figure 5:
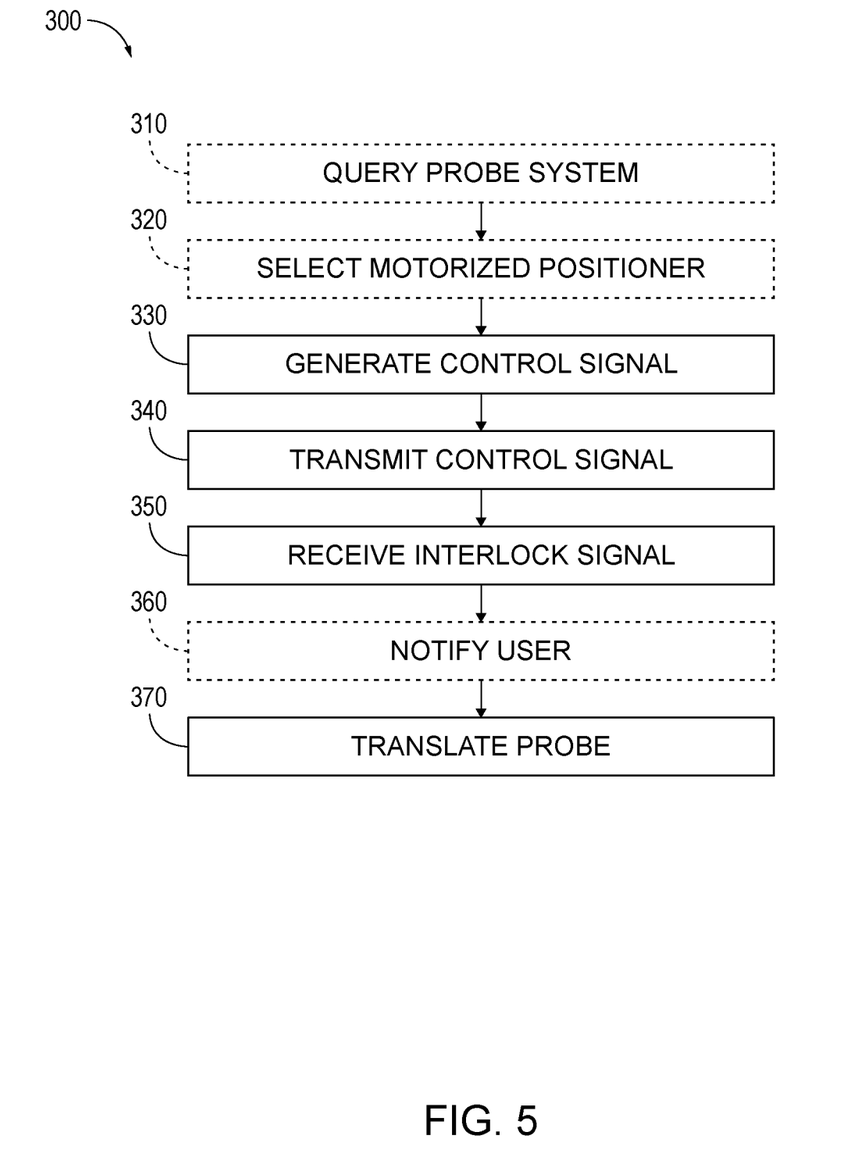
FIG. 5 is a flowchart depicting examples of methods of remotely operating a motorized positioner of a probe system, according to the present disclosure.

FIG. 5 is a flowchart depicting examples of methods 300 of remotely operating a motorized positioner of a probe system, according to the present disclosure. Methods 300 may include querying the probe system at 310 and/or selecting a motorized positioner at 320, and methods 300 include generating a control signal at 330 and transmitting the control signal at 340. Methods 300 also may include receiving an interlock signal at 350 and/or notifying a user at 360, and methods 300 include translating a probe at 370.

Querying the probe system at 310 may include querying the probe system to determine a number of motorized positioners of and/or associated with the probe system. Stated differently, the probe system may include a plurality of motorized positioners, and the querying at 310 may include querying the probe system to determine the number of motorized positioners in the plurality of motorized positioners. Examples of the probe system are disclosed herein with reference to probe system 10. Examples of the motorized positioners are disclosed herein with reference to motorized positioners 60.

The querying at 310 may be performed with any suitable timing and/or sequence during methods 300. As examples, the querying at 310 may be performed prior to the selecting at 320, prior to the generating at 330, prior to the transmitting at 340, prior to the receiving at 350, prior to the notifying at 360, and/or prior to the translating at 370.

Selecting the motorized positioner at 320 may include selecting a desired motorized positioner of the plurality of motorized positioners and/or from the number of motorized positioners. This may include selecting with, via, and/or utilizing a positioner selection structure of the remote control device. Stated differently, the selecting at 320 may include selecting, from among the plurality of motorized positioners, the desired motorized positioner with which to perform the translating at 370, and the translating at 370 then may be performed utilizing the desired motorized positioner. Examples of the positioner selection structure are disclosed herein with reference to positioner selection structure 200.

The selecting at 320 may be performed with any suitable timing and/or sequence during methods 300. As examples, the selecting at 320 may be performed subsequent to the querying at 310, prior to the generating at 330, prior to the transmitting at 340, prior to the receiving at 350, prior to the notifying at 360, and/or prior to the translating at 370.

Generating the control signal at 330 may include generating the control signal utilizing a remote control device. Examples of the remote control device are disclosed herein with reference to remote control device 100. The control signal may be based upon and/or indicative of rotation of one or more rotary encoders of the remote control device. Examples of the one or more rotary encoders are disclosed herein with reference to first rotary encoder 150, second rotary encoder 160, and/or third rotary encoder 170.

The generating at 330 may be performed with any suitable timing and/or sequence during methods 300. As examples, the generating at 330 may be performed subsequent to the querying at 310, subsequent to and/or at least partially concurrently with the selecting at 320, prior to the transmitting at 340, prior to the receiving at 350, prior to the notifying at 360, and/or prior to the translating at 370.

Transmitting the control signal at 340 may include transmitting the control signal to the probe system. This may include transmitting the control signal with, via, and/or utilizing an interface device of the remote control device. Examples of the interface device are disclosed herein with reference to interface device 184. Additionally or alternatively, the transmitting at 340 may include transmitting the control signal with, via, and/or utilizing a network connection, examples of which are disclosed herein with reference to network connection 90.

The transmitting at 340 may be performed with any suitable timing and/or sequence during methods 300. As examples, the transmitting at 340 may be performed subsequent to the querying at 310, subsequent to the selecting at 320, subsequent to the generating at 330, prior to the receiving at 350, prior to the notifying at 360, and/or prior to the translating at 370.

As discussed in more detail herein, the probe system may include a translation interlock, which may be configured to restrict motion of the probe in a direction that is parallel to the support surface when a distance between the probe and a device under test (DUT) is less than a threshold distance. In such a configuration, methods 300 may include receiving the interlock signal at 350. The receiving at 350 may include receiving the interlock signal from an interlock actuator of the remote control device; and, responsive to the receiving at 350, methods 300 further may include defeating the translation interlock and permitting motion of the probe in the direction that is parallel to the support surface when the distance between the probe and the DUT is less than the threshold distance. Stated differently, and as discussed, the receiving at 350 may include permitting motion of the probe that otherwise would be restricted, thereby permitting the remote control device to control the operation of the motorized positioner in a manner that may be similar to a manual override device of the motorized positioner. Examples of the interlock actuator are disclosed herein with reference to interlock actuator 190. Examples of the manual override device are disclosed herein with reference to manual override device 68.

The receiving at 350 may be performed with any suitable timing and/or sequence during methods 300. As examples, the receiving at 350 may be performed subsequent to the querying at 310, subsequent to the selecting at 320, subsequent to the generating at 330, prior to, at least partially concurrently with, and/or subsequent to the transmitting at 340 and/or the notifying at 360, and/or prior to the translating at 370.

When methods 300 include the receiving at 350, methods 300 further may include notifying the user at 360. The notifying at 360 may include notifying the user that the distance between the probe and the DUT is less than the threshold distance. This may include notifying with, via, and/or utilizing a distance notification structure of the remote control device. Examples of the distance notification structure are disclosed herein with reference to distance notification structure 210.

The notifying at 360 may be performed with any suitable timing and/or sequence during methods 300. As examples, the notifying at 360 may be performed subsequent to the querying at 310, subsequent to the selecting at 320, subsequent to the generating at 330, prior to, at least partially concurrently with, and/or subsequent to the transmitting at 340 and/or the receiving at 350, and/or prior to the translating at 370.

Translating the probe at 370 may include translating the probe of the probe system relative to a support surface of the probe system. The translating at 370 may be based, at least in part, on the control signal. Stated differently, the control signal may control, regulate, and/or initiate the translating at 370. Stated still differently, rotation of the one or more rotary encoders of the remote control device may cause and/or facilitate the translating at 370.

The translating at 370 may be performed with any suitable timing and/or sequence during methods 300. As examples, the translating at 370 may be performed subsequent to the querying at 310, subsequent to the selecting at 320, subsequent to the generating at 330, prior to, at least partially concurrently with, and/or subsequent to the transmitting at 340, and/or subsequent to the receiving at 350, and/or subsequent to the notifying at 360.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a relationship, which is other than directional, may include not only the recited "substantial" relationship, but also the full extent of the recited relationship. A substantial amount of a recited relationship may include at least 75% of the recited relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Additionally or alternatively, the phrase "at least substantially," when utilized to describe a directional relationship, means that the described component(s) are within a threshold angular variation of the given directional relationship. As an example, the phrase "at least substantially orthogonal" means that three components are within the threshold angular variation of being orthogonal to one another. As another example, the phrase "at least substantially parallel" means that two or more components are within the threshold angular variation of being parallel to one another. As another example, the phrase "at least substantially perpendicular" means that two or more components are within the threshold angular variation of being perpendicular to one another. As another example, the phrase "at least substantially normal" means that one or more components is within the threshold angular variation of being normal to one or more other components. As another example, the phrase "at least substantially vertical" means that one or more components is within the threshold angular variation of being vertical. As another example, the phrase "at least substantially horizontal" means that one or more components is within the threshold angular variation of being horizontal. Examples of the threshold angular variation include angular variations of at most 5 degrees, at most 4 degrees, at most 3 degrees, at most 2 degrees, at most 1 degree, at most 0.5 degrees, or at most 0.25 degrees.

Illustrative, non-exclusive examples of remote control devices, probe systems, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A remote control device for a motorized positioner of a probe system, the remote control device comprising:
  a first rotary encoder including a first encoder shaft, wherein the first rotary encoder is configured to generate a first encoder signal indicative of rotation of the first encoder shaft;
  a second rotary encoder including a second encoder shaft, wherein the second rotary encoder is configured to generate a second encoder signal indicative of rotation of the second encoder shaft;
  a third rotary encoder including a third encoder shaft, wherein the third rotary encoder is configured to generate a third encoder signal indicative of rotation of the third encoder shaft; and
  a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system.

A2. The remote control device of paragraph A1, wherein at least one of:
  (i) the first rotary encoder includes a first rotary knob that is attached to the first encoder shaft and configured to be gripped by a user of the remote control device during rotation of the first encoder shaft;
  (ii) the second rotary encoder includes a second rotary knob that is attached to the second encoder shaft and configured to be gripped by a user of the remote control device during rotation of the second encoder shaft; and
  (iii) the third rotary encoder includes a third rotary knob that is attached to the third encoder shaft and configured to be gripped by a user of the remote control device during rotation of the third encoder shaft.

A3. The remote control device of any of paragraphs A1-A2, wherein the first encoder shaft is configured to rotate about a first rotary axis, wherein the second encoder shaft is configured to rotate about a second rotary axis, wherein the third encoder shaft is configured to rotate about a third rotary axis, and further wherein the first rotary axis, the second rotary axis, and the third rotary axis are orthogonal, or at least substantially orthogonal, to one another.

A4. The remote control device of any of paragraphs A1-A3, wherein the motorized positioner is configured to operatively support a probe of the probe system and to operatively translate the probe relative to a support surface of a chuck of the probe system, and further wherein at least one of:
  (i) the first encoder signal is configured to direct the motorized positioner to operatively translate the probe along a first axis that extends normal, or at least substantially normal, to the support surface;
  (ii) the second encoder signal is configured to direct the motorized positioner to operatively translate the probe along a second axis that extends parallel, or at least substantially parallel, to the support surface and perpendicular, or at least substantially perpendicular, to the first axis; and
  (iii) the third encoder signal is configured to direct the motorized positioner to operatively translate the probe along a third axis that extends parallel, or at least substantially parallel, to the support surface and perpendicular, or at least substantially perpendicular, to both the first axis and the second axis.

A5. The remote control device of any of paragraphs A1-A4, wherein at least one of:
  (i) the first encoder shaft extends vertically, or at least substantially vertically;
  (ii) the second encoder shaft extends horizontally, or at least substantially horizontally;
  (iii) the third encoder shaft extends horizontally, or at least substantially horizontally; and
  (iv) the first encoder shaft, the second encoder shaft, and the third encoder shaft extend orthogonal, or at least substantially orthogonal, to one another.

A6. The remote control device of any of paragraphs A1-A5, wherein the remote processing device includes at least one of a microprocessor and a microcontroller.

A7. The remote control device of any of paragraphs A1-A6, wherein the remote processing device includes an interface device configured to transmit the control signal to the motorized positioner of the probe system.

A8. The remote control device of paragraph A7, wherein the interface device includes at least one of:

(i) a wired interface device;
(ii) a universal serial bus (USB) device;
(iii) a wired Ethernet device;
(iv) a wireless interface device;
(v) a Bluetooth® device; and
(vi) a wireless Ethernet device.

A9. The remote control device of any of paragraphs A1-A8, wherein the remote control device further includes an interlock actuator, wherein the interlock actuator is configured to selectively generate an interlock signal responsive to actuation of the interlock actuator by a/the user of the remote control device.

A10. The remote control device of paragraph A9, wherein the interlock actuator includes, or is, an interlock actuator momentary switch.

A11. The remote control device of any of paragraphs A9-A10, wherein at least one of:
(i) the remote processing device is configured only to generate the control signal during generation of the interlock signal;
(ii) the remote processing device is configured only to permit transmission of the control signal to the motorized positioner during generation of the interlock signal;
(iii) the first rotary encoder is configured only to generate the first encoder signal during generation of the interlock signal;
(iv) the second rotary encoder is configured only to generate the second encoder signal during generation of the interlock signal;
(v) the third rotary encoder is configured only to generate the third encoder signal during generation of the interlock signal; and
(vi) the motorized positioner is configured only to respond to the control signal during generation of the interlock signal.

A12. The remote control device of any of paragraphs A1-A11, wherein the probe system includes a plurality of motorized positioners, and further wherein the remote control device further includes a positioner selection structure configured to be actuated, by a/the user of the remote control device, to select a desired motorized positioner of the plurality of motorized positioners.

A13. The remote control device of paragraph A12, wherein the positioner selection structure includes a positioner selection actuator configured to be actuated by the user of the remote control device and to generate a positioner selection signal, which is configured to indicate, to the probe system, the desired motorized positioner, wherein the remote processing device is configured to receive the positioner selection signal, and further wherein the control signal is indicative of the positioner selection signal.

A14. The remote control device of paragraph A13, wherein the positioner selection actuator includes a positioner selection actuator momentary switch.

A15. The remote control device of any of paragraphs A12-A14, wherein the positioner selection structure further includes a positioner selection display configured to indicate, to the user of the remote control device, which motorized positioner of the plurality of motorized positioners is selected as the desired motorized positioner.

A16. The remote control device of paragraph A15, wherein the positioner selection display includes at least one of:
(i) a light emitting diode (LED) display;
(ii) a plurality of labeled LEDs;
(iii) a numeric display; and
(iv) an alphanumeric display.

A17. The remote control device of any of paragraphs A1-A16, wherein the remote control device further includes a housing that at least partially contains the first rotary encoder, the second rotary encoder, the third rotary encoder, and the remote processing device.

A18. The remote control device of paragraph A17, wherein the housing defines an enclosed volume, and further wherein at least one of:
(i) the housing includes a first encoder opening and the first rotary encoder is positioned within the enclosed volume such that the first encoder shaft is accessible via the first encoder opening;
(ii) the housing includes a second encoder opening and the second rotary encoder is positioned within the enclosed volume such that the second encoder shaft is accessible via the second encoder opening; and
(iii) the housing includes a third encoder opening and the third rotary encoder is positioned within the enclosed volume such that the third encoder shaft is accessible via the third encoder opening.

A19. The remote control device of any of paragraphs A17-A18, wherein the housing includes at least one of:
(i) a first label, which is associated with the first encoder shaft and is indicative of a first motion direction of the motorized positioner responsive to rotation of the first encoder shaft;
(ii) a second label, which is associated with the second encoder shaft and is indicative of a second motion direction of the motorized positioner responsive to rotation of the second encoder shaft; and
(iii) a third label, which is associated with the third encoder shaft and is indicative of a third motion direction of the motorized positioner responsive to rotation of the third encoder shaft;
wherein the first motion direction, the second motion direction, and the third motion direction are orthogonal, or at least substantially orthogonal, to one another.

A20. The remote control device of any of paragraphs A17-A19, wherein the housing further includes an interlock actuator opening, and further wherein a/the interlock actuator is accessible via the interlock actuator opening.

A21. The remote control device of any of paragraphs A17-A20, wherein the housing defines an upper surface and further wherein the first rotary encoder is accessible via the upper surface.

A22. The remote control device of paragraph A21, wherein the housing defines a front surface that extends perpendicular, or at least substantially perpendicular, to the upper surface, and further wherein the second rotary encoder is accessible via the front surface.

A23. The remote control device of paragraph A22, wherein the housing defines a side surface that extends perpendicular, or at least substantially perpendicular, to both the upper surface and the front surface, and further wherein the third rotary encoder is accessible via the side surface.

A24. The remote control device of paragraph A23, wherein the housing further defines at least one of:
(i) a bottom surface that extends at least one of parallel to the upper surface and perpendicular, or at least substantially perpendicular, to both the front surface and the side surface;
(ii) a back surface that extends at least one of parallel to the front surface and perpendicular, or at least substantially perpendicular, to both the side surface and the bottom surface; and (iii) an opposed side surface that extends at least one of parallel to the side surface and perpendicular, or at least substantially perpendicular, to both the bottom surface and the front surface.

A25. The remote control device of any of paragraphs A22-A24, wherein the housing defines a transition surface that tapers from the upper surface to the front surface, and further wherein at least one of:
(i) a/the interlock actuator is accessible via the transition surface; and
(ii) a/the positioner selection structure is accessible via the transition surface.

A26. The remote control device of any of paragraphs A1-A25, wherein the remote control device further includes a remote computer, and further wherein the remote control device is configured to transmit the control signal to the motorized positioner via the remote computer.

B1. A probe system, comprising:
a chuck that defines a support surface configured to support a substrate that includes a device under test (DUT);
a signal generation and analysis assembly configured to at least one of generate a test signal and analyze a resultant signal;
a probe configured to at least one of provide the test signal to the DUT and receive the resultant signal from the DUT;
a motorized positioner configured to selectively translate the probe, relative to the support surface, in three dimensions and along three axes;
the remote control device of any of paragraphs A1-A26; and
a local processing device configured to receive the control signal from the remote processing device and to control the operation of the motorized positioner based, at least in part, on the control signal.

B2. The probe system of paragraph B 1, wherein the three axes include three orthogonal, or at least substantially orthogonal, axes.

B3. The probe system of any of paragraphs B1-B2, wherein at least one of:
(i) the three axes include a first axis, and further wherein the local processing device is configured to direct the motorized positioner to move the probe in a/the first motion direction, which is parallel to the first axis, responsive to the control signal being indicative of rotation of the first encoder shaft;
(ii) the three axes include a second axis, and further wherein the local processing device is configured to direct the motorized positioner to move the probe in a/the second motion direction, which is parallel to the second axis, responsive to the control signal being indicative of rotation of the second encoder shaft; and
(iii) the three axes include a third axis, and further wherein the local processing device is configured to direct the motorized positioner to move the probe in a/the third motion direction, which is parallel to the third axis, responsive to the control signal being indicative of rotation of the third encoder shaft.

B4. The probe system of any of paragraphs B1-B3, wherein the probe system includes a/the plurality of motorized positioners, and further wherein the local processing device is configured to control the operation of a/the desired motorized positioner of the plurality of motorized positioners based, at least in part, on the control signal.

B5. The probe system of any of paragraphs B1-B4, wherein the probe includes an electrical probe configured to at least one of provide an electrical test signal to the DUT and receive an electrical resultant signal from the DUT.

B6. The probe system of any of paragraphs B1-B5, wherein the probe includes an electromagnetic probe configured to at least one of provide an electromagnetic test signal to the DUT and receive an electromagnetic resultant signal from the DUT.

B7. The probe system of any of paragraphs B1-B6, wherein the motorized positioner includes a manual override device configured to manually translate the probe relative to the support surface along the three axes.

B8. The probe system of paragraph B7, wherein the manual override device includes: (i) a first manual override knob configured to manually translate the probe relative to the support surface along a/the first axis of the three axes;
(ii) a second manual override knob configured to manually translate the probe relative to the support surface along a/the second axis of the three axes; and
(iii) a third manual override knob configured to manually translate the probe relative to the support surface along a/the third axis of the three axes.

B9. The probe system of paragraph B8, wherein at least one of:
(i) an orientation of a/the first rotary knob of the remote control device corresponds to an orientation of the first manual override knob;
(ii) an orientation of a/the second rotary knob of the remote control device corresponds to an orientation of the second manual override knob; and
(iii) an orientation of a/the third rotary knob of the remote control device corresponds to an orientation of the third manual override knob.

B10. The probe system of any of paragraphs B8-B9, wherein at least one of:
(i) an appearance of a/the first rotary knob of the remote control device corresponds to an appearance of the first manual override knob;
(ii) an appearance of a/the second rotary knob of the remote control device corresponds to an appearance of the second manual override knob; and
(iii) an appearance of a/the third rotary knob of the remote control device corresponds to an appearance of the third manual override knob.

B11. The probe system of any of paragraphs B7-B10, wherein labeling on the remote control device corresponds to labeling on the manual override device.

B12. The probe system of any of paragraphs B7-B11, wherein an external appearance of the remote control device corresponds to an external appearance of the manual override device.

B13. The probe system of any of paragraphs B1-B12, wherein the probe system includes a plurality of electronic interlocks, and further wherein the probe system is configured to override at least one electronic interlock of the plurality of electronic interlocks responsive to generation of a/the interlock signal by the remote control device.

B14. The probe system of paragraph B13, wherein the at least one electronic interlock includes a distance interlock configured to restrict motion of the probe, in a direction that is parallel to the support surface, when a distance between the probe and the DUT is less than a threshold distance.

B15. The probe system of paragraph B14, wherein the remote control device further includes a distance notification structure configured to notify a/the user that the distance between the probe and the DUT is less than the threshold distance when:

(i) the distance between the probe and the DUT is less than the threshold distance; and (ii) the remote control device generates the interlock signal.

B16. The probe system of any of paragraphs B1-B15, wherein the motorized positioner is positioned within at least one of a factory, a research facility, and a clean room.

B17. The probe system of paragraph B16, wherein the remote control device is at least one of:

(i) external the factory;

(ii) external the research facility; and (iii) external the clean room.

C1. A method of remotely operating a motorized positioner of a probe system, the method comprising:

generating a control signal utilizing the remote control device of any of paragraphs A1-A26;

transmitting the control signal to the probe system; and translating a probe of the probe system relative to a support surface of the probe system, wherein the translating is based, at least in part, on the control signal.

C2. The method of paragraph C1, wherein, prior to the generating, the method further includes;

(i) querying the probe system to determine a number of motorized positioners associated with the probe system; and (ii) selecting, with a positioner selection structure of the remote control device, a desired motorized positioner of the number of motorized positioners;

wherein the translating includes translating the probe utilizing the desired motorized positioner.

C3. The method of any of paragraphs C1-C2, wherein the probe system includes a translation interlock configured to restrict motion of the probe in a direction that is parallel to the support surface when a distance between the probe and a device under test (DUT) is less than a threshold distance, and further wherein, prior to the translating, the method includes receiving an interlock signal from an interlock actuator of the remote control device, wherein the receiving includes defeating the translation interlock and permitting motion of the probe in the direction that is parallel to the support surface when the distance between the probe and the DUT is less than the threshold distance.

C4. The method of paragraph C3, wherein the method further includes notifying a user that the distance between the probe and the DUT is less than the threshold distance.

C5. The method of any of paragraphs C1-C4, wherein the transmitting the control signal includes transmitting the control signal at least partially via at least one of:

(i) a wired network connection;

(ii) a wireless network connection; and (iii) a cellular network.

C6. The method of any of paragraphs C1-C5, wherein the probe system includes any suitable structure of any of the probe systems of any of paragraphs B1-B17.

INDUSTRIAL APPLICABILITY

The remote control devices, probe systems, and methods disclosed herein are applicable to the semiconductor test industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A remote control device for a motorized positioner of a probe system, wherein the probe system is configured to test a device under test (DUT) that is formed on a substrate, wherein the probe system includes a chuck that defines a support surface configured to support the substrate, and further wherein the motorized positioner is configured to selectively translate a probe relative to the support surface and along three axes, the remote control device comprising:

a first rotary encoder including a first encoder shaft and a first rotary knob that is attached to the first encoder shaft and configured to be gripped by a user of the remote control device during rotation of the first encoder shaft, wherein the first rotary encoder is configured to generate a first encoder signal indicative of rotation of the first encoder shaft;

a second rotary encoder including a second encoder shaft and a second rotary knob that is attached to the second encoder shaft and configured to be gripped by a user of the remote control device during rotation of the second encoder shaft, wherein the second rotary encoder is configured to generate a second encoder signal indicative of rotation of the second encoder shaft;

a third rotary encoder including a third encoder shaft and a third rotary knob that is attached to the third encoder shaft and configured to be gripped by a user of the remote control device during rotation of the third encoder shaft, wherein the third rotary encoder is configured to generate a third encoder signal indicative of rotation of the third encoder shaft; and a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system.

2. The remote control device of claim 1, wherein the first encoder shaft is configured to rotate about a first rotary axis, wherein the second encoder shaft is configured to rotate about a second rotary axis, wherein the third encoder shaft is configured to rotate about a third rotary axis, and further wherein the first rotary axis, the second rotary axis, and the third rotary axis are at least substantially orthogonal to one another.

3. The remote control device of claim 1, wherein the remote processing device includes a transmitter configured to transmit the control signal to the motorized positioner of the probe system.

4. The remote control device of claim 1, wherein the remote control device further includes an interlock actuator, wherein the interlock actuator is configured to selectively generate an interlock signal responsive to actuation of the interlock actuator by a user of the remote control device.

5. The remote control device of claim 4, wherein at least one of:
   (i) the remote processing device is configured only to generate the control signal during generation of the interlock signal;
   (ii) the remote processing device is configured only to permit transmission of the control signal to the motorized positioner during generation of the interlock signal;
   (iii) the first rotary encoder is configured only to generate the first encoder signal during generation of the interlock signal;
   (iv) the second rotary encoder is configured only to generate the second encoder signal during generation of the interlock signal;
   (v) the third rotary encoder is configured only to generate the third encoder signal during generation of the interlock signal; and
   (vi) the motorized positioner is configured only to respond to the control signal during generation of the interlock signal.

6. The remote control device of claim 1, wherein the probe system includes a plurality of motorized positioners, and further wherein the remote control device includes a positioner selection structure configured to be actuated, by a user of the remote control device, to select a desired motorized positioner of the plurality of motorized positioners.

7. The remote control device of claim 1, wherein the remote control device further includes a remote computer, and further wherein the remote control device is configured to transmit the control signal to the motorized positioner via the remote computer.

8. A probe system, comprising:
   a chuck that defines a support surface configured to support a substrate that includes a device under test (DUT);
   a signal generation and analysis assembly configured to at least one of generate a test signal and analyze a resultant signal;
   a probe configured to at least one of provide the test signal to the DUT and receive the resultant signal from the DUT;
   a motorized positioner configured to selectively translate the probe, relative to the support surface, in three dimensions and along three axes;
   a remote control device that includes:
   (i) a first rotary encoder including a first encoder shaft and a first rotary knob that is attached to the first encoder shaft and configured to be gripped by a user of the remote control device during rotation of the first encoder shaft, wherein the first rotary encoder is configured to generate a first encoder signal indicative of rotation of the first encoder shaft;
   (ii) a second rotary encoder including a second encoder shaft and a second rotary knob that is attached to the second encoder shaft and configured to be gripped by a user of the remote control device during rotation of the second encoder shaft, wherein the second rotary encoder is configured to generate a second encoder signal indicative of rotation of the second encoder shaft;
   (iii) a third rotary encoder including a third encoder shaft and a third rotary knob that is attached to the third encoder shaft and configured to be gripped by a user of the remote control device during rotation of the third encoder shaft, wherein the third rotary encoder is configured to generate a third encoder signal indicative of rotation of the third encoder shaft; and
   (iv) a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system; and
   a local processing device configured to receive the control signal from the remote processing device and to control the operation of the motorized positioner based, at least in part, on the control signal.

9. The probe system of claim 8, wherein at least one of:
   (i) the three axes include a first axis, and further wherein the local processing device is configured to direct the motorized positioner to move the probe in a first motion direction, which is parallel to the first axis, responsive to the control signal being indicative of rotation of the first encoder shaft;
   (ii) the three axes include a second axis, and further wherein the local processing device is configured to direct the motorized positioner to move the probe in a second motion direction, which is parallel to the second axis, responsive to the control signal being indicative of rotation of the second encoder shaft; and
   (iii) the three axes include a third axis, and further wherein the local processing device is configured to direct the motorized positioner to move the probe in a third motion direction, which is parallel to the third axis, responsive to the control signal being indicative of rotation of the third encoder shaft.

10. The probe system of claim 8, wherein the probe system includes a plurality of motorized positioners, and further wherein the local processing device is configured to control the operation of a desired motorized positioner of the plurality of motorized positioners based, at least in part, on the control signal.

11. The probe system of claim 8, wherein the motorized positioner includes a manual override device configured to manually translate the probe relative to the support surface along the three axes, wherein the manual override device includes:
   (i) a first manual override knob configured to manually translate the probe relative to the support surface along a first axis of the three axes;
   (ii) a second manual override knob configured to manually translate the probe relative to the support surface along a second axis of the three axes; and
   (iii) a third manual override knob configured to manually translate the probe relative to the support surface along a third axis of the three axes; and
   wherein:
   (i) an orientation of the first rotary knob of the remote control device corresponds to an orientation of the first manual override knob;
   (ii) an orientation of the second rotary knob of the remote control device corresponds to an orientation of the second manual override knob; and iii an orientation of the third rotary knob of the remote control device corresponds to an orientation of the third manual override knob.

12. The probe system of claim 11, wherein:
(i) an appearance of the first rotary knob of the remote control device corresponds to an appearance of the first manual override knob;
(ii) an appearance of the second rotary knob of the remote control device corresponds to an appearance of the second manual override knob; and
(iii) an appearance of the third rotary knob of the remote control device corresponds to an appearance of the third manual override knob.

13. The probe system of claim 8, wherein the probe system includes a plurality of electronic interlocks, and further wherein the probe system is configured to override at least one electronic interlock of the plurality of electronic interlocks responsive to generation of an interlock signal by the remote control device.

14. The probe system of claim 13, wherein the at least one electronic interlock includes a distance interlock configured to restrict motion of the probe, in a direction that is parallel to the support surface, when a distance between the probe and the DUT is less than a threshold distance.

15. The probe system of claim 14, wherein the remote control device further includes a distance notification structure configured to notify a user that the distance between the probe and the DUT is less than the threshold distance when:
(i) the distance between the probe and the DUT is less than the threshold distance; and
(ii) the remote control device generates the interlock signal.

16. A method of remotely operating a motorized positioner of a probe system, wherein the probe system is configured to test a device under test (DUT) that is formed on a substrate, wherein the probe system includes a chuck that defines a support surface configured to support the substrate, and further wherein the motorized positioner is configured to selectively translate a probe relative to the support surface and along three axes, the method comprising:
generating a control signal utilizing a remote control device that includes:
(i) a first rotary encoder including a first encoder shaft and a first rotary knob that is attached to the first encoder shaft and configured to be gripped by a user of the remote control device during rotation of the first encoder shaft, wherein the first rotary encoder is configured to generate a first encoder signal indicative of rotation of the first encoder shaft;
(ii) a second rotary encoder including a second encoder shaft and a second rotary knob that is attached to the second encoder shaft and configured to be gripped by a user of the remote control device during rotation of the second encoder shaft, wherein the second rotary encoder is configured to generate a second encoder signal indicative of rotation of the second encoder shaft;
(iii) a third rotary encoder including a third encoder shaft and a third rotary knob that is attached to the third encoder shaft and configured to be gripped by a user of the remote control device during rotation of the third encoder shaft, wherein the third rotary encoder is configured to generate a third encoder signal indicative of rotation of the third encoder shaft; and
(iv) a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system;
transmitting the control signal to the probe system; and
translating the probe of the probe system relative to the support surface of the probe system, wherein the translating is based, at least in part, on the control signal.

17. The method of claim 16, wherein, prior to the generating, the method further includes:
(i) querying the probe system to determine a number of motorized positioners associated with the probe system; and
(ii) selecting, with a positioner selection structure of the remote control device, a desired motorized positioner of the number of motorized positioners; and
wherein the translating includes translating the probe utilizing the desired motorized positioner.

18. The method of claim 16, wherein the probe system includes a translation interlock configured to restrict motion of the probe in a direction that is parallel to the support surface when a distance between the probe and a device under test (DUT) is less than a threshold distance, and further wherein, prior to the translating, the method includes receiving an interlock signal from an interlock actuator of the remote control device, wherein the receiving includes defeating the translation interlock and permitting motion of the probe in the direction that is parallel to the support surface when the distance between the probe and the DUT is less than the threshold distance.

19. The method of claim 18, wherein the method further includes notifying a user that the distance between the probe and the DUT is less than the threshold distance.

20. A remote control device for a motorized positioner of a probe system, wherein the probe system is configured to test a device under test (DUT) that is formed on a substrate, wherein the probe system includes a chuck that defines a support surface configured to support the substrate, and further wherein the motorized positioner is configured to selectively translate a probe relative to the support surface and along three axes, the remote control device comprising:
a first rotary encoder including a first encoder shaft, wherein the first rotary encoder is configured to generate a first encoder signal indicative of rotation of the first encoder shaft;
a second rotary encoder including a second encoder shaft, wherein the second rotary encoder is configured to generate a second encoder signal indicative of rotation of the second encoder shaft;
a third rotary encoder including a third encoder shaft, wherein the third rotary encoder is configured to generate a third encoder signal indicative of rotation of the third encoder shaft;
a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system; and
an interlock actuator, wherein the interlock actuator is configured to selectively generate an interlock signal responsive to actuation of the interlock actuator by a user of the remote control device.

21. The remote control device of claim 20, wherein at least one of:

(i) the remote processing device is configured only to generate the control signal during generation of the interlock signal;
(ii) the remote processing device is configured only to permit transmission of the control signal to the motorized positioner during generation of the interlock signal;
(iii) the first rotary encoder is configured only to generate the first encoder signal during generation of the interlock signal;
(iv) the second rotary encoder is configured only to generate the second encoder signal during generation of the interlock signal;
(v) the third rotary encoder is configured only to generate the third encoder signal during generation of the interlock signal; and
(vi) the motorized positioner is configured only to respond to the control signal during generation of the interlock signal.

22. A probe system, comprising:
a chuck that defines a support surface configured to support a substrate that includes a device under test (DUT);
a signal generation and analysis assembly configured to at least one of generate a test signal and analyze a resultant signal;
a probe configured to at least one of provide the test signal to the DUT and receive the resultant signal from the DUT;
a motorized positioner configured to selectively translate the probe, relative to the support surface, in three dimensions and along three axes;
a remote control device that includes:
(i) a first rotary encoder including a first encoder shaft, wherein the first rotary encoder is configured to generate a first encoder signal indicative of rotation of the first encoder shaft;
(ii) a second rotary encoder including a second encoder shaft, wherein the second rotary encoder is configured to generate a second encoder signal indicative of rotation of the second encoder shaft;
(iii) a third rotary encoder including a third encoder shaft, wherein the third rotary encoder is configured to generate a third encoder signal indicative of rotation of the third encoder shaft;
(iv) a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system; and
(v) an interlock actuator, wherein the interlock actuator is configured to selectively generate an interlock signal responsive to actuation of the interlock actuator by a user of the remote control device; and
a local processing device configured to receive the control signal from the remote processing device and to control the operation of the motorized positioner based, at least in part, on the control signal.

23. The probe system of claim 22, wherein at least one of:
(i) the remote processing device is configured only to generate the control signal during generation of the interlock signal;
(ii) the remote processing device is configured only to permit transmission of the control signal to the motorized positioner during generation of the interlock signal;
(iii) the first rotary encoder is configured only to generate the first encoder signal during generation of the interlock signal;
(iv) the second rotary encoder is configured only to generate the second encoder signal during generation of the interlock signal;
(v) the third rotary encoder is configured only to generate the third encoder signal during generation of the interlock signal; and
(vi) the motorized positioner is configured only to respond to the control signal during generation of the interlock signal.

24. A method of remotely operating a motorized positioner of a probe system, wherein the probe system is configured to test a device under test (DUT) that is formed on a substrate, wherein the probe system includes a chuck that defines a support surface configured to support the substrate, and further wherein the motorized positioner is configured to selectively translate a probe relative to the support surface and along three axes, the method comprising:
generating a control signal utilizing a remote control device that includes:
(i) a first rotary encoder including a first encoder shaft, wherein the first rotary encoder is configured to generate a first encoder signal indicative of rotation of the first encoder shaft;
(ii) a second rotary encoder including a second encoder shaft, wherein the second rotary encoder is configured to generate a second encoder signal indicative of rotation of the second encoder shaft;
(iii) a third rotary encoder including a third encoder shaft, wherein the third rotary encoder is configured to generate a third encoder signal indicative of rotation of the third encoder shaft; and
(iv) a remote processing device configured to receive the first encoder signal, the second encoder signal, and the third encoder signal, to generate a control signal that is indicative of the first encoder signal, the second encoder signal, and the third encoder signal, and to transmit the control signal to the motorized positioner of the probe system;
transmitting the control signal to the probe system; and
translating the probe of the probe system relative to the support surface of the probe system, wherein the translating is based, at least in part, on the control signal;
wherein the probe system includes a translation interlock configured to restrict motion of the probe in a direction that is parallel to the support surface when a distance between the probe and a device under test (DUT) is less than a threshold distance, and further wherein, prior to the translating, the method includes receiving an interlock signal from an interlock actuator of the remote control device, wherein the receiving includes defeating the translation interlock and permitting motion of the probe in the direction that is parallel to the support surface when the distance between the probe and the DUT is less than the threshold distance.

25. The method of claim 24, wherein the method further includes notifying a user that the distance between the probe and the DUT is less than the threshold distance.

* * * * *